TAPE TENSION CONTROL SYSTEM FOR MAGNETIC TAPE RECORDER

Filed Dec. 29, 1967 2 Sheets-Sheet 1

INVENTOR.
ALAN G. GRACE
BY
FOWLER, KNOBBE & MARTENS
ATTORNEYS.

TAPE TENSION CONTROL SYSTEM FOR MAGNETIC TAPE RECORDER

Filed Dec. 29, 1967

INVENTOR.
ALAN G. GRACE
BY
FOWLER, KNOBBE
& MARTENS
ATTORNEYS.

United States Patent Office 3,535,441

Patented Oct. 20, 1970

3,535,441
TAPE TENSION CONTROL SYSTEM FOR MAGNETIC TAPE RECORDER

Alan G. Grace, San Carlos, Calif., assignor to Westel Company, San Mateo, Calif., a copartnership of Westel Incorporated, Westel Associates, and Westel California Investors, all corporations of California Filed Dec. 29, 1967, Ser. No. 694,693
Int. Cl. G11b *15/43*; B65h *59/38*; H02p *5/46*
U.S. Cl. 178—6.6 11 Claims

ABSTRACT OF THE DISCLOSURE

A magnetic tape recorder having a record-reproduce drum intermediate supply and take-up capstans which transport tape from a supply reel, about the drum, and on to a take-up reel at a speed determined by a control signal recorded on the tape. A tension error sensing means generates a signal proportional to the difference between tape tension existing during playback and the tape tension that existed during record. The tension error signal is separated into its low and high frequency components and applied to the supply reel and supply capstans respectively to compensate for tension errors.

BACKGROUND OF THE INVENTION

Field of the invention

This invention relates to drum type magnetic tape recorders for recording and/or playing back signals on a magnetic recording tape and has particular reference to a dual capstan system for engaging the magnetic recording tape and moving it about the drum while minimizing and/or correcting for errors in tape tension.

Description of the prior art

A drum type magnetic tape recorder includes a drum which serves as a mandrel for the tape and means for guiding and moving the tape on the drum surface along a path oblique to the drum axis. The magnetic tape extends substantially in excess of 360° in a spiral winding about a three-piece composite drum with the center drum member being rotatable about the drum axis and being referred to herein as recording drum. A record-reproduce head is mounted adjacent the periphery of the center drum member for recording and/or playing back signals along successive oblique traces on the tape. The head will traverse a distance equivalent to the circumference of the drum for each record trace.

SUMMARY OF THE INVENTION

In the drum type recorder, each record trace occupies a particular length of tape in accordance with the length of tape wrapped around the head during the recording. Since the recording tape is flexible, variations in tape tension will produce variations in the length of the recorded traces. Accordingly, one feature of this invention is directed toward maintaining the tension of the tape on the drum at a constant value during the recording process.

When the tape is to be played back, the environmental conditions such as temperature and humidity may have changed from what they were during record, therefore altering the length of the tape. Also, the tape may be played back on a different machine which may contain variations in the drum dimensions or higher or lower frictional forces in the tape path. Also, sudden variations in the tape tension may be produced by a sticky fingerprint on the tape or on some guiding surface during either record or playback which can significantly alter the total frictional sources on the tape along the tape path producing tape tension variations.

Accordingly, another feature of this invention involves (i) establishing and maintaining a different average tape tension and (ii) inducing desirable variations in the tape tension about the drum during playback for maintaining the same record trace length and locations about the drum during playback as were present during the recording process. In this manner, the undesirable tape tensions are either compensated for or eliminated.

In accordance with the present invention, signals are recorded on a tape which is driven around a record-reproduce drum by a supply capstan and a take-up capstan which are hard servoed together at a predetermined speed. A reel servo system maintains the supply reel responsive to the tape tension between the supply reel and the supply capstan for supplying tape to the supply capstan. The reel servo system also maintains the take-up reel responsive to the tape tension between the take-up reel and the take-up capstan for receiving tape from the take-up capstan.

By hard servoing the two capstans together to drive the tape at a predetermined speed around the drum, the tape loop between the capstans is isolated from the tape tension perturbations external to the loop in the fashion of a low pass filter and assures a substantially constant tape tension around the drum during record.

The signals recorded on the tape are reproduced by driving the tape around the drum by the two capstans in response to a signal recorded on a control track of the tape so that the tape tension between the capstans during reproduce substantially duplicates the tape tension which existed during record. A tape tension error sensing means is provided which generates a signal proportional to the tape tension difference which exists between the capstans during reproduce and that which existed between them during record. The non-varying portion of this tension error signal is applied to the reel servo system for providing steady state tension corrections within the loop. The varying portion of the tension error signal is applied to the capstan servo system to modulate the tape tension on an instantaneous basis within the loop so that the loop tape tension during reproduce intimately matches the loop tape tension existing during record.

DESCRIPTION OF THE PREFERRED EMBODIMENT

Figure 1:
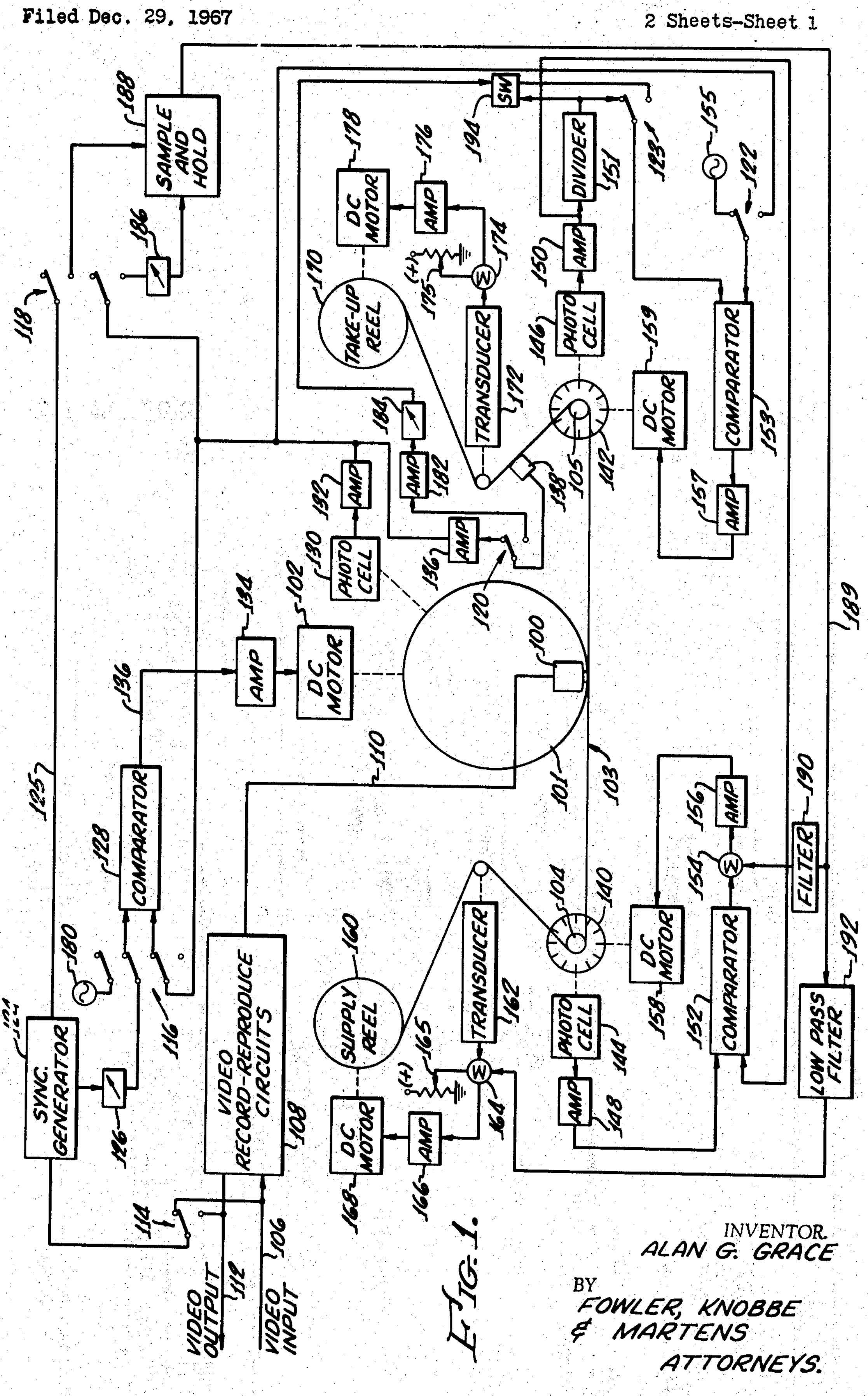
FIG. 1 is a system diagram of a drum type tape recorder embodying the present invention.

Referring now to FIG. 1, there is shown a block diagram illustrating a preferred embodiment of a system for recording and reproducing a broad frequency spectrum signal in accordance with the present invention. The circuitry for each of the individual blocks are known in the art and are therefore not detailed any further herein. A transducing head 100 is carried on the periphery of a record-reproduce drum 101 and is driven by a direct current motor 102. Recording tape 103 is driven around the drum 101 by a supply capstan 104 and a take-up capstan 105. Advantageously, the drum 101 and transducing head 100 are constructed as disclosed in the copending U.S.A. patent application of Alexander R. Maxey, Ser. No. 536,107, filed Mar. 21, 1966 entitled "Tape Recorder," now abandoned, assigned to Westel Company, assignee of the present invention.

Composite video input signals are applied to the system on line 106 as an input to a video record-reproduce stage 108. Record-reproduce stage 108 includes suitable means for producing a modulated signal on line 110 to head 100 for recording on the tape 103 during the record process. During playback, a recorded signal on the tape 103 is picked up by head 100 and applied to the record-reproduce stage 108 which further includes the necessary demodulation means for reproducing the recorded signal on output line 112.

A plurality of switches 114, 116, 118, 120, 122 and 123 are illustrated in FIG. 1 and are each shown in their record positions. During playback, these switches are uniformly switched down by electrical means not shown.

THE SYSTEM AND ITS OPERATION DURING RECORD

In put lead 106 and output lead 112 are selectively connected, by switch 114, to a sync generator 124 which is advantageously constructed in accordance with my copending U.S.A. application, Ser. No. 535,929, filed Mar. 21, 1966, entitled "Sync Generator and Recording System Including Same," assigned to Westel Company, assignee of the present invention. Sync generator 124 receives the video input signal on line 106 and generates a clean version of the vertical sync signals which are stripped from the video signal and are applied to a variable one-shot multivibrator 126. The output from the one-shot 126 is applied through switch 116 to the reference input of comparator 128.

The angular position of the recording head 100 within the drum 101 is ascertained by a photocell 130 and amplifier 132. Each revolution of the head 100 will cause a light beam, from a source not shown, incident upon photocell 130 to be interrupted resulting in an output pulse to amplifier 132. The output of amplifier 132 then will be a pulse train having a frequency and phase corresponding to the rotational velocity and position of head 100. The output of amplifier 132 is connected to the error input of comparator 128 through the terminals of switch 116.

Avantageously, comparator 128 is constructed in accordance with my copending U.S.A. patent application, Ser. No. 625,788, filed Mar. 24, 1967, entitled "Switched Frequency and Phase Comparator," now United States Pat. No. 3,478,178, assigned to Westel Company, assignee of the present invention. The output of comparator 128 drives the record head motor 102 through an amplifier 134. Comparator 128 includes a frequency comparison means (not shown) for comparing the frequency difference between the pulses applied on its reference input and the pulses applied on its error input and generating a D.C. signal output having a magnitude dependent upon this difference. If, for example, the error pulses from amplifier 132 are at a lower frequency than the stripped vertical pulses applied as a reference, comparator 128 generates a D.C. signal output which increases the speed of motor 102 until the pulse frequency from the amplifier 132 and one-shot 126 are equal. Conversely, if the pulses from amplifier 132 are at a higher frequency than those from one-shot 126, the output of comparator 128 slows down motor 102. Comparator 128 also includes a phase detecting means comprising a sample-and-hold stage (not shown) which causes comparator 128 to generate an output to motor 102 to maintain a fixed phase relationship between the reference and error pulse inputs once the frequencies of these pulses have been matched by the frequency comparison means. Advantageously, the sample-and-hold stage includes means for generating a sawtooth pulse each time a reference pulse input is received. The sawtooth pulse will be sampled each time an error pulse is received by comparator 128. Assuming that tne recording head 100 is correctly phased, a constant output signal will be generated on line 136. If an out-of-phase condition between the reference and error pulses occurs, the sawtooth will be sampled at a different time providing a change in the amplitude of the signal on line 136 for slowing or speeding up the motor 102 to bring the error pulses back into correct phase.

Accordingly, it will be seen that during the recording process, drum motor 102 is driven in accordance with an error signal derived by comparing the velocity and position of the head 100 with the vertical sync pulses derived from sync generator 124. The head 100 will therefore make one rotation for each vertical frame of the video signal, that is, head 100 will rotate at e.g. 60 c.p.s. in the N.T.S.C. system.

The pulse train output from amplifier 132 is also an input to amplifier 136. The output of amplifier 136 is connected to a read/write head 138 through switch 120. During record, read/write head 138 records a pulse train on a control track of the tape 103 corresponding to the frequency and phase of head 100.

As previously discussed, the tape 103 is driven around the drum 101 by the supply capstan 104 and the take-up capstan 105. The capstan servo system includes optical discs 140 and 142, having radial marks around their periphery and coupled to the supply capstan 108 and the take-up capstan 105, respectively. Light sources, not shown, direct light beams incident upon photocells 144 and 146. Rotation of the capstans and discs will result in the light beams being interrupted by the radial marks and consequently, pulse outputs from photocells 144 and 146 which are amplified by amplifiers 148 and 150, respectively. The pulse train outputs from amplifiers 148 and 150 will have a frequency and phase corresponding to the velocity and position of supply capstan 104 and the take-up capstan 105, respectively.

The pulse train output from amplifier 150 is divided by divider 151 and applied as an error input to comparator 153 through the terminals of switch 122 during record. A pulse source 155 generates a train of pulses which are applied as the reference input to comparator 153 also through the terminals of switch 122. Advantageously, the pulse output from amplifier 150 is approximately 1.56 k.c.p.s. and the pulse frequency from source 155 is 60 c.p.s. Accordingly, divider 151 must divide the output of amplifier 150 by 26 to match the frequency of reference source 155. The output of comparator 153 is amplified by amplifier 157 and drives D.C. motor 159. Comparator 153 is constructed in the same manner as comparator 128 and functions to drive the take-up capstan 105 at a frequency and phase determined by pulse source 155 during record.

The output of amplifier 150 is also connected as a reference input to comparator 152 in the supply capstan servo loop. The error signal input to comparator 152 is generated by amplifier 148. The output of comparator 152 passes through a summing junction 154, is amplified by amplifier 156 and drives D.C. motor 158. Comparator 152 is constructed in the same manner as comparators 128 and 153 and serves to drive the supply capstan 104 at a frequency and phase determined by the take-up capstan 105.

Accordingly, the capstan servo system locks both the take-up capstan 105 and the supply capstan 104 at a frequency and phase determined by the reference pulse source 155 during record. The tape tension within the tape loop, that is, the tape tension between the captans, will therefore remain constant since there is no relative movement of one capstan with respect to the other.

Tape is supplied to the supply capstan 104 by a supply reel 160. The reel servo system includes a transducer 162 responsive to the tape tension between the supply reel 160 and the supply capstan 104 and generates a signal proportional to that tension. The output of transducer 162 is summed in summation junction 164 with a tension set signal from potentiometer 165. The resultant signal is amplified by amplifier 166 and connected to D.C. motor 168 to drive the supply reel 160 at a speed to maintain a predetermined tension, set by potentiometer 165, between the reel 160 and the capstan 104. In a like manner, transducer 172, summing junction 174, potentiometer 175, amplifier 176 and motor 178 respond to maintain a predetermined tape tension between take-up reel 170 and take-up capstan 105.

THE SYSTEM AND OPERATION DURING PLAYBACK

During playback, the switches 114, 116, 118, 120 and 122 are all moved to their down position. Accordingly, the video output signal from the record-reproduce circuits 108 on line 112 is applied as the input to sync generator 124. The output from sync generator 124 to one-shot 126 is then the stripped vertical pulses from the video signal reproduced from tape 103 by record-reproduce circuit 108. The output of one-shot 126 is now applied as the error input to comparator 128 through switch 116 and the reference input is generated by 60 c.p.s. pulse source 180. The comparator 128 output therefore drives the motor 102 to rotate head 100 at such a speed that the vertical pulses stripped from the recorded video signal correspond to a frequency and phase determined by reference 180. During playback then, the drum servo speeds up the motor 102 if the recording on the tape was originally made at too slow a speed or slows down motor 102 if the recording was originally made at too fast a speed.

Further, during playback, read/write head 138 reproduces the control signal, corresponding to the frequency and phase of the head 100, which was recorded on the control track of tape 103 during record. This signal is connected as the error input to comparator 153 by way of switch 120, amplifier 182, variable one-shot 184 and switch 123. The reference input to comparator 153 is the output of photocell 130 which is amplified by amplifier 132 and routed through switch 122. Accordingly, capstan 105 is driven by the supply capstan servo at such a speed that the frequency and phase of the signals reproduced by read/write head 138 match the frequency and phase of the pulses received by comparator 153 from amplifier 132. In this manner, the capstan 105 will properly "track" the signals on the control track. That is, the video tracks on tape 103 will be correctly positioned with respect to the position of the head 100. During playback, the supply capstan 104 remains phase locked to the take-up capstan 105 by virtue of the connection between the output of amplifier 150 and the reference input of comparator 152.

It is important to the operation of the take-up capstan servo that the signal to the comparator 153 from the control track of the tape be maintained at all times during reproduce. Accordingly, the output of divider 151 is connected as an input to switch 194 which includes a signal present sensing means (not shown) for switching the output of the switch 194 to switch 123 from the control track signal to the output of divider 151 if the sensing means determines that the control track signal is absent for a predetermined period of time. This insures that the take-up capstan servo loop will not run away if the control track signal is lost.

Figure 2:
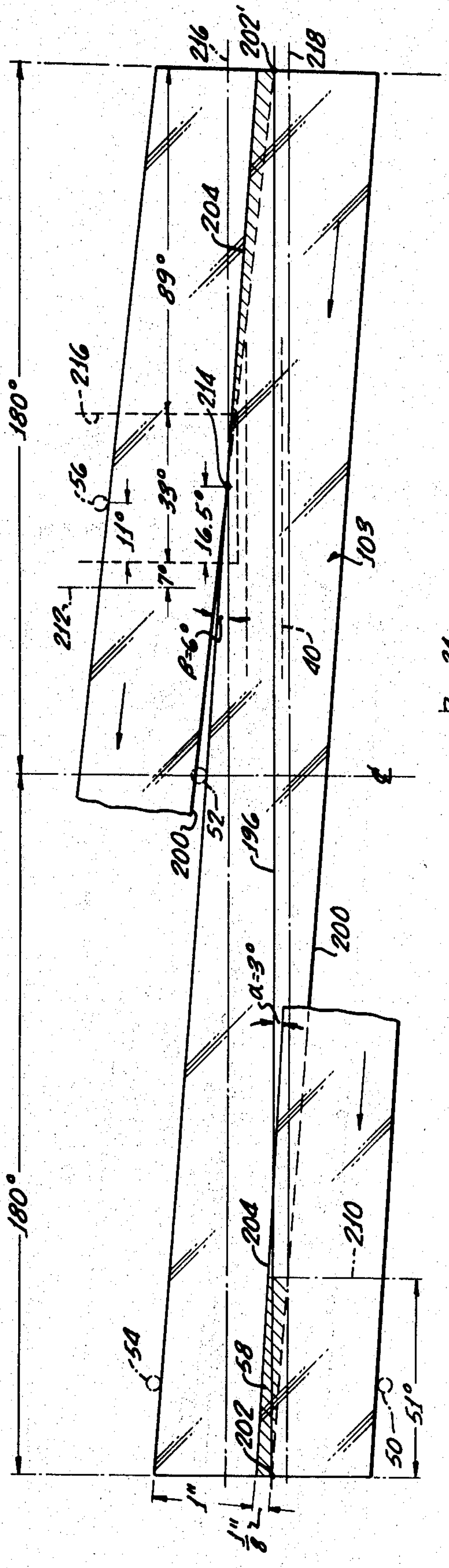
FIG. 2 is a linear diagrammatic representation of the spiral tape winding about the drum.
Figure 3:
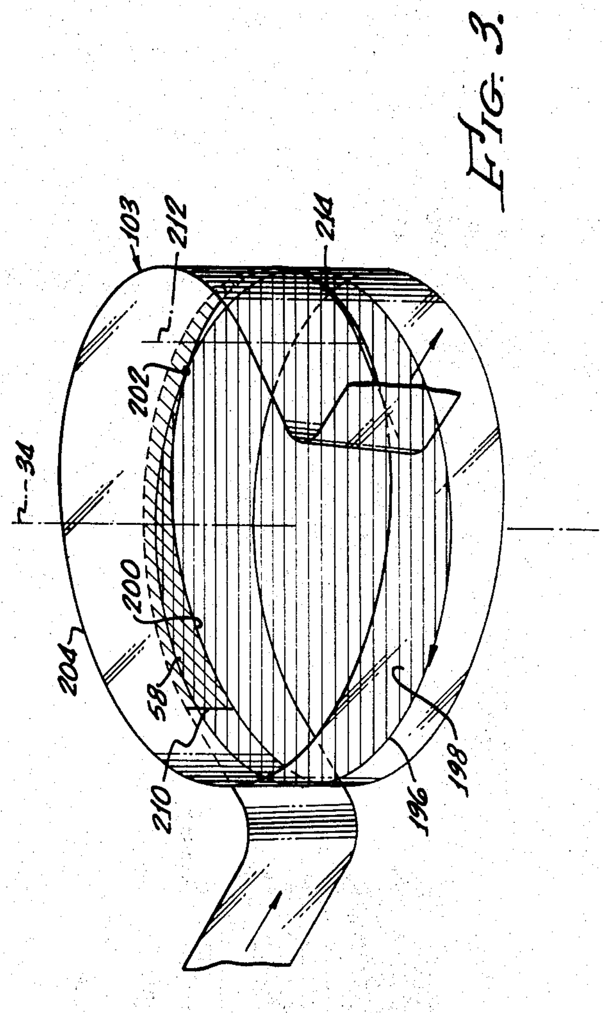
FIG. 3 is a schematic perspective view of the tape spiral.

Referring now to FIGS. 2 and 3, there is shown a diagrammatic representation of the tape 103 as it would appear wound around drum 101. Scan line 196 represents the path described by the record-reproduce head 100 as it rotates about the drum axis 36 in plane 198. With the head 100 rotating in a clockwise direction as viewed from the top, it will "fall off" of the lower exposed edge 200 at a point 202 and onto the previous tape convolution at a point 202' which is spaced downwardly from the top edge 204 by a distance of about one-eighth inch as the result of the tape overlap area 58. The drop-off point 202 and the drop-on point 202' are very nearly the same point when the tape is wrapped about the drum, although at this point there is unavoidably some small discontinuity of about 100 to 180 microseconds in the signal which is referred to as the "dropout."

The overlap area 58 inherently leaves a border area 206 along the top edge 204 of the tape. It is in this border area that signals may be recorded in a longitudinal fashion. The control track 208 extends longitudinally in this area.

The tape enters the drum approximately along a tangent line 210° in advance of the drop-off point 202 at an angle of about three degrees and extends about the drum for 540° to a tape exit tangent 212 where the tape exits the drum at an exit angle of about six degrees. The tape spiral is of increasing pitch such that the lower edge 200 of the exiting tape crosses the upper edge 204 of the preceding tape convolution at a point 214 which is located about 105° around the drum from the drop-off point 202. At the cross-over point 214, the exiting tape is pulling out from under the previous tape convolution and the upper drum member has a recessed area illustrated schematically at 216 which provides relief from the tape edges at the cross-over point. The tape entrance tangent 210 and the cross-over point 214 define the opposite ends of the overlap area 58.

Referring again to FIG. 1, during record the one-shot 126 is adjusted so that the dropout or the point at which the record-reproduce head 100 crosses the drop-off point 202 is coincident with the vertical blanking interval in the composite video signal. Thus, none of the actual video signal information is lost by reason of this dropout; only synchronization signals are lost.

A tape tension error signal is generated on line 189 by an error sensing means comprising sync generator 124, photocell 130, amplifier 132, variable one-shot multivibrator 186 and sample-and-hold circuit 188. Sync generator 124, as disclosed in the previously referenced patent application Ser. No. 535,929, includes a means for stripping horizontal pulses from the reproduced video signal input from line 112. Generator 124 also includes a voltage controlled oscillator (VCO) circuit (not shown) which has a frequency and a phase made to correspond to the frequency and phase of the stripped horizontal pulses by a phase detector circuit (not shown). This phase detector compares the pulses from the VCO with the stripped horizontal pulses and generates an error signal that is passed through a compensating circuit which effectively integrates it and applies it to the VCO to bring it into alignment with the stripped pulses over a period of time determined by the time constant of the compensating circuit. The error signal output of the phase detector then is directly related to the instantaneous phase difference between the pulses generated by the VCO and the stripped horizontal pulses from the reproduced video signal. This error signal output of the phase detector is connected as the output of the sync generator 124 on line 125 to the sample-and-hold circuit 188 through switch 118.

The output of amplifier 132, representing the frequency and phase of the head 100 is also an input to circuit 188 through switch 118 and variable one-shot 186. The sample-and-hold circuit 188 is advantageously constructed as disclosed in copending U.S.A. patent application of Alexander R. Maxey, Ser. No. 700,316, filed Dec. 29, 1967, entitled "Dual Capstan Control System," now Pat. No. 3,419,202 assigned to Westel Company, assignee of the present invention, and samples the signal on line 125 immediately following the occurrence of the dropout during the vertical blanking interval. This is accomplished by adjusting the time delay provided by the one-shot 186 so that it supplies a pulse on its output at the proper moment relative to dropout. The sample-and-hold circuit 188 includes means (not shown) for charging up a capacitor (not shown) to the level existing on line 125 during the duration of the pulse from one-shot 186. Advantageously, the duration of the pulse output from one-shot 186 is approximately 1 millisecond. During this sampling time interval, about 15 horizontal pulses are sensed by the phase detector in the sync generator 124 and compared with a like number of pulses from the internal VCO of the sync generator 124. The capacitor in the sample-and-hold circuit 188, during this time interval, will be charged to a voltage level representing the sum of the error signal increments required to change the phase of the pulse outputs of the VCO to match the phase of the stripped horizontal pulses. It can be seen then that this voltage level is proportional to the tension error existing around the drum 101 since if, for example, no tension error exists, all of the horizontal sync pulses will be evenly spaced and once the VCO was brought into its proper frequency and phase relationship with the horizontal pulses, no correction of the VCO will be necessary. The charge held on the capacitor in the sample-and-hold circuit 188 during each hold interval is amplified by a high input impedance amplifier and is connected as the output of circuit 188 on line 189. Thus, the sample-and-hold circuit 188 samples the signal on line 125 for a brief time interval, e.g. 1 millisecond, about 60 times per second, and the voltage level on its output line 189 will remain at a constant value during each hold period while the record-reproduce head 100 scans the next record trace on the tape 103. At the moment of sampling just following the dropout in the next vertical blanking interval, the voltage on lead 189 will change to a different voltage level (assuming that the signal level on 125 has changed) such change being in accordance with the tape tension error. Further, during playback, the supply capstan 104 is modulated with respect to the take-up capstan 105 to correct for A.C. tape tension errors within the loop. The tension error signal on line 189 is filtered by filter 190 and applied to summing junction 154 in the supply capstan servo loop. Filter 190 eliminates any steady state component of tension error and passes only the time varying portion of the signal. Since the supply capstan servo and the take-up capstan servo are phase locked together, that is, the radial marks on optical disc 140 are phase locked to the radial marks on disc 142, the amount of modulation of the supply capstan 104 with respect to the take-up capstan 105 is limited to the distance between radial marks. Any correction in tape tension which would require a modulation of the supply capstan 105 exceeding this distance would be impossible. Hence, the steady state portion of the error signal is not applied to the supply capstan servo. Note that by increasing the distance between radial marks on the optical discs, the amount of tension correction possible by the capstans is increased. Conversely, decreasing the distance between radial marks decreases the correction possible.

The tension error signal is also applied to summing junction 164 in the supply reel servo loop through low pass filter 192 which will pass only the steady state component of the error signal. The input to junction 164 will cause an increased or decreased torque to be applied to the supply reel 160 by motor 168 thereby effecting a steady state tension correction within the loop.

In the preferred embodiment of the present invention, the supply capstan servo loop has a flat frequency response up to approximately 28 cycles per second which is adequate to compensate for any tape tension errors that will be sensed by the apparatus. Typically, the tension errors will have a frequency of 6 cycles per second. Since the sample-and-hold circuit 188 samples the tension error on line 125 at a rate of 60 cycles per second, a typical error cycle will be sampled 10 times each second which is a sufficient enough approximation of the error to the supply capstan servo loop to bring the tension correction to within 250 nanoseconds.

I claim:

1. In a drum type magnetic tape recorder for recording or playing back signals on a magnetic recording tape, the improvement comprising:

motor driven first and second capstans for engaging the magnetic recording tape and moving it about the drum;

motor driven first and second tape reels for supplying tape to and receiving tape from the first and second capstans respectively;

first and second tape tension indicating means for generating signals proportional to the tape tension between the first tape reel and the first capstan, and between the second tape reel and the second capstan respectively;

first and second reel servo means responsive to the signals generated by the first and second tape tension indicating means for driving the first and second tape reels respectively to maintain a predetermined tape tension;

first capstan servo means for driving the first capstan at a predetermined speed; and, second capstan servo means for driving the second capstan at the same speed as the first capstan.

2. The apparatus of claim 1, further including:

means for sensing tension errors in the tape extending about the drum during playback; and, tension error separation means for separating the tension error into a first component having a frequency below a predetermined level and a second component including all frequencies above the predetermined level, the first tension component being inserted into the first reel servo means and the second tension component being inserted into the second capstan servo means whereby compensating changes are made in tape tension.

3. In a drum type of magnetic video tape recorder, a system for varying the tape tension during playback to maintain the lineal dimension of the tape wound around said drum the same as when said tape was recorded comprising:

a transducing head movable relative said drum for reproducing the video signal from said recording tape, reel servo means for maintaining a predetermined constant tension on said tape, capstan servo means for moving the tape about said drum in synchronism with the movement of said head, means responsive to the video signal reproduced by said head for providing a tape tension error signal whose magnitude varies in accordance with differences in lineal dimension of the tape wound around said drum from that which it was during record, sample-and-hold means for sampling said error signal proximate the vertical blanking interval and holding said sampled value while said head scans the next succeeding record trace on said tape, means coupled to said sample-and-hold means for filtering its output signal into a steady state signal component and a time varying signal component, means for coupling said steady state signal to said reel servo means for modifying the tape tension produced thereby for compensating for the steady state tension errors, and means coupling said time varying signal component to said capstan servo means for modifying the tension of the tape proximate said transducer head for compensating for the time varying tension error.

4. The system described in claim 3 wherein:

said capstan servo means includes (i) a tape supply capstan and a tape take-up capstan for engaging said tape and moving it about said drum, said tape take-up capstan being servo driven in accordance with an error signal derived by comparing the velocity and phase of the tape and the velocity and phase of said transducing head, said tape supply capstan being phase locked to said take-up capstan and (ii) means for adding said time varying signal component to the servo drive of said tape supply capstan.

5. The system described in claim 3 wherein:

said reel servo means includes (i) a take-up reel responsive to changes in tension on the tape being taken up on said take-up reel, and a servo driven motor coupled to said take-up reel for maintaining a predetermined tension on said tape being taken up on said take-up reel, (ii) a supply reel, a transducer responsive to changes in tension of the tape being supplied by said supply reel, and a servo driven motor coupled to said supply seel for maintaining a predetermined tension on the tape being supplied from said supply reel, and (iii) means for adding said steady state signal component to the servo drive of said supply reel motor.

6. In a magnetic tape recorder, a system for compensating for tape tension errors comprising:

a movable transducing head for reproducing a signal from said recording tape, reel servo means for maintaining a constant tension on said tape, capstan servo means for synchronizing the movement of said tape past said transducer head with the movement of said head, sensing means for sensing tension errors in said tape and producing an output signal which varies in time in accordance with said errors, means coupled to said sensing means for separating said output signal into a low frequency tension error signal component and a high frequency tension error signal component, means coupling said low frequency tension error signal component to said reel servo means for modifying the tape tension produced thereby for compensating for the low frequency tension errors, and means coupling said high frequency tension error signal component to said capstan servo means for modifying the tension of the tape proximate said transducer head for compensating for the high frequency tension errors.

7. In a magnetic tape recorder, a system for compensating for tape tension errors comprising:

a movable transducing head for reproducing a signal from said recording tape, reel servo means for maintaining a constant tension on said tape, capstan servo means for synchronizing the movement of said tape past said transducer head with the movement of said head, sensing means for sensing tension errors in said tape and producing an output signal which varies in time in accordance with said errors, means coupling the output signal of said sensing means to said reel servo means and to said capstan servo means for modifying both the steady state and time varying tension of the tape proximate said transducer head for compensating for both the steady state and time varying tension errors.

8. In a magnetic tape recorder, a system for compensating for tension errors in the tape during playback comprising:

a transducing head for reproducing a signal from said recording tape;

sensing means coupled to said transducing head and responsive to a synchronizing portion of said reproduced video signal for providing an error signal proportional to the tension error of the tape during playback;

means coupled to said sensing means for separating said signal into a low frequency tension error signal component and a high frequency tension error signal component;

a tape supply capstan and a tape take-up capstan for engaging the magnetic recording tape and moving it past said transducing head;

means for driving said take-up capstan in synchronization with a pulse train recorded on said tape;

servo means for driving said tape supply capstan in synchronization with said take-up capstan;

tension means engaging said tape for varying the tension upon the tape supplied to said supply capstan;

means responsively coupled to said low frequency tension error signal component and operatively coupled to said tension means for correcting low frequency steady state tension error; and, means for coupling said high frequency tension error signal component to said servo means for correcting time varying tension errors.

9. In a drum type magnetic tape recorder for recording or playing back signals on a magnetic recording tape, the improvement comprising:

a transducer head movable relative said drum for recording and reproducing a signal from said tape, motor driven supply and take-up capstans for engaging the magnetic recording tape and moving it about said drum, first servo means for driving said take-up capstan in synchronism with a reference oscillator during recording and driving said take-up capstan to frequency and phase lock said tape with said moving head during playback, and second servo means coupled to said supply capstan and to said take-up capstan for frequency and phase locking said supply capstan to said take-up capstan.

10. The improvement of claim 9 characterized further by (a) sensing means for producing a signal representative of tension error in the tape between said capstans, and (b) means for coupling said tension error signal to said second servo means so as to modify the tension between said capstans.

11. The improvement of claim 10 characterized further in that said coupling means includes a filter to pass only the time varying portion of said tension error signal to said second servo means.

References Cited

UNITED STATES PATENTS

| | | | |
|---|---|---|---|
| 3,025,344 | 3/1962 | Bosustow | 178—6.6 |
| 3,050,594 | 8/1962 | Bick et al. | 179—100.2 |
| 3,112,052 | 11/1963 | Johnson | 226—42 |
| 3,231,668 | 1/1966 | Nishiwaki et al. | 178—6.6 |
| 3,295,032 | 12/1966 | Branco | 318—7 |
| 3,345,457 | 10/1967 | MacLeod | 178—6.6 |
| 3,378,646 | 4/1968 | Shashoua et al. | 179—100.2 |

BERNARD KONICK, Primary Examiner

S. B. POKOTILOW, Assistant Examiner

U.S. Cl. X.R.

179—100.2; 242—75.51; 318—7